US010481761B2

(12) United States Patent
Jouhikainen et al.

(10) Patent No.: US 10,481,761 B2
(45) Date of Patent: Nov. 19, 2019

(54) DYNAMIC DESIGN OF USER INTERFACE ELEMENTS

(71) Applicant: Capital One Services, LLC, McLean, VA (US)

(72) Inventors: Hannes Jouhikainen, McLean, VA (US); Timur Sherif, Washington, DC (US); Steve Blanchet, Alexandria, VA (US); Zviad Aznaurashvili, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 15/947,553

(22) Filed: Apr. 6, 2018

(65) Prior Publication Data

US 2019/0310762 A1 Oct. 10, 2019

(51) Int. Cl.
*G06F 3/0481* (2013.01)
*G06F 9/451* (2018.01)
*G06F 17/21* (2006.01)
*G06F 8/38* (2018.01)
*G06F 16/735* (2019.01)

(52) U.S. Cl.
CPC ............ *G06F 3/04817* (2013.01); *G06F 8/38* (2013.01); *G06F 9/451* (2018.02); *G06F 16/735* (2019.01); *G06F 17/214* (2013.01)

(58) Field of Classification Search
CPC ......... G06F 9/451; G06F 3/0481; G06K 9/52; G06K 9/46
See application file for complete search history.

(56) References Cited

U.S. PATENT DOCUMENTS

| 6,633,315 | B1 | 10/2003 | Sobeski et al. |
| 7,917,859 | B1 | 3/2011 | Singh et al. |
| 9,704,054 | B1* | 7/2017 | Tappen .................... G06K 9/46 |
| 9,983,775 | B2* | 5/2018 | Jain ..................... G06F 3/04847 |
| 2009/0002178 | A1* | 1/2009 | Guday ................. A61B 5/0002 340/573.1 |

(Continued)

OTHER PUBLICATIONS

"V2 Sneak Peek: Theming," online blog, dated Dec. 28, 2012, downloaded from https://www.alfredapp.com/blog/announcements/v2-sneak-peek-theming/ (Year: 2012).*

*Primary Examiner* — Jennifer N To
*Assistant Examiner* — Eric J Yoon
(74) *Attorney, Agent, or Firm* — DLA Piper LLP (US)

(57) ABSTRACT

A user device may receive sensor data relating to one or more physical objects, transmit the sensor data to a server, receive a user profile relating to a user of the device, identify a user interface element corresponding to an application, modify the user interface element based on the user profile, and display the modified user interface element. A server may receive data relating to one or more physical objects, identify the one or more design patterns based on the one or more physical objects, create a user profile, update the user profile, receive application data relating to one or more applications running on a device remote from the server, identify a user interface element corresponding to the one or more applications running on the device, modify the user interface element based on the updated user profile, and transmit the modified user interface element to the device.

20 Claims, 8 Drawing Sheets

(56) References Cited

U.S. PATENT DOCUMENTS

2009/0193055 A1* 7/2009 Kuberka ................. G06F 16/51
2013/0086481 A1* 4/2013 Balasaygun .......... G06F 3/0481
                                                       715/745
2015/0287092 A1* 10/2015 Samadani .......... G06Q 30/0269
                                                       705/14.66

* cited by examiner

DYNAMIC DESIGN OF USER INTERFACE ELEMENTS

TECHNICAL FIELD

The present disclosure relates generally to methods and systems for dynamically designing user interface elements that may be displayed on a user device.

BACKGROUND

People have varying design preferences for everyday objects and digital user interface elements. One person may prefer one type of font in a document, such as a word document or e-mail, whereas another person may prefer a different type of font in the same type of document. Other examples of design preferences include a preference for round objects, or a preference for objects with sharp edges, or other different geometric shapes. In the design and implementation of digital products, designers and programmers must often make design choices before a digital product is released and made available to consumers. Designers and programmers can make informed decisions using for example marketing, sales, or other information, or can use personal experience in making a decision regarding the design of a digital product, but at some point the digital product must be prepared and finalized before being made available to a consumer through a display generated by an application, program, or other software.

SUMMARY OF THE DISCLOSURE

Systems and methods described herein may provide for dynamic design of user interface elements displayed on a device.

For example, a device configured to dynamically display user interface elements on the device may include a processor, a display in communication with the processor, a wireless transceiver in communication with the processor, and a non-transitory memory storing instructions that, when executed by the processor, cause the processor to perform processing including receiving sensor data relating to one or more physical objects, the data generated by a sensor; transmitting, by the wireless receiver, the sensor data to a server; receiving, by the processor, a user profile relating to a user of the device, the user profile comprising profile data describing one or more user preferences; identifying a user interface element corresponding to an application, the application running on the device, modifying the user interface element based on the user profile; and displaying, on the display of the device, the modified user interface element.

In some embodiments, the processing may further include receiving additional data relating to one or more second physical objects, the additional data being received from a second sensor. The processing may include transmitting the additional data to the server and receiving an updated user profile relating to the user of the device, the updated user profile comprising updated profile data.

In some embodiments, the user interface element may include a font. The modifying the user interface element may further include changing the font to a different font prior to display of the modified user interface element.

In some embodiments, the user interface element may further include one or more user interface windows, each of the one or more user interface windows having one or more first shapes. The processing for modifying the one or more user interface windows may further include changing each of the one or more user interface windows to a second shape different from the first shape.

In some embodiments, the device may further include a sensor. The sensor may be in communication with the processor, and the processor may receive the data relating to one or more physical objects from the sensor.

In some embodiments, the profile data of the user profile may be updated based on one or more probability deterministic scores before the processor receives the user profile. The probability deterministic scores may relate to the one or more user preferences.

As another example, a method for dynamically changing a user interface element on a device may include receiving, by a processor of the device, data relating to one or more physical objects, the data being generated by a sensor; transmitting, by a wireless transceiver of the device, the data to a server; receiving, by the processor, a user profile in response to transmitting the data to the server, and identifying, by the processor, a user interface element corresponding to an application running on the device; modifying, by the processor, the user interface element based on the updated user profile, and displaying the modified user interface element on a display of the device.

In some embodiments, the method may include the displayed modified user interface element relating to the application running on the device, and the one or more physical objects in the data describe one or more design patterns, and the user profile is based on the one or more design patterns.

In some embodiments, the method may include receiving, by a server, the data. The method may include identifying, by the server, the one or more design patterns in the data, and updating, by the server, the user profile based on the identified one or more design patterns.

In some embodiments, the method may include receiving, by the processor, additional data relating to one or more second physical objects. The method may include the additional data being received from a second sensor. The method may include identifying one or more second design patterns in the additional data, the one or more second design patterns based on the one or more second physical objects, and updating the design profile based on the identified one or more second design patterns.

In some embodiments, the user interface element may include a font. The method may include modifying the user interface element by changing the font to a different font prior to display of the modified user interface element.

In some embodiments, the user interface element can include one or more user interface windows with a first shape. The method may include modifying the user interface element further by changing the one or more user interface windows to a second shape.

In some embodiments, the method may include the sensor in the device, and the sensor further includes a camera.

In some embodiments, the method may include updating, by the server, the user profile based on one or more probability deterministic scores. The method may include the probability deterministic scores describing one or more user preferences.

In some embodiments, the method may include receiving, by the server, additional design data comprising one or more additional design patterns. The method may include associating, by the server, the additional design patterns with the user profile, and updating, by the server, the user profile based on associating the additional design patterns with the user profile.

In another example, a system for providing dynamic design of user interface elements may include a server comprising a non-transitory memory, the memory storing software instructions, and one or more processors configured to execute the software instructions. The software instructions may be configured to receive data relating to one or more physical objects, the data including one or more design patterns based on the one or more physical objects; identify the one or more design patterns based on the one or more physical objects; create a user profile, the user profile corresponding to a user; update the user profile, the updated user profile based on the one or more design patterns identified based on the one or more physical objects; receive application data relating to one or more applications running on a device remote from the server; identify a user interface element corresponding to the one or more applications running on the device; modify the user interface element based on the updated user profile; and transmit the modified user interface element to the device. The system may include instructions for causing the modified user interface element to be displayed on a screen of the device, the device running the one or more applications when the modified user interface element is displayed.

In some embodiments, the software instructions may be further configured to receive additional data relating to one or more additional physical objects, the additional data including one or more additional design patterns based on the one or more additional physical objects, and the one or more additional design patterns being different from the one or more design patterns. The software instructions may be configured to identify the one or more additional design patterns based on the one or more additional physical objects. The software instructions may be configured to update the user profile based on the one or more additional design patterns.

In some embodiments, the user interface element can include a font. The software instructions may be further configured to modify the user interface element to change the font to a different font.

In some embodiments, the user interface element can include one or more user interface windows with a first shape. The software instructions may be further configured to modify the user interface element to change the one or more user interface windows to a second shape.

In some embodiments, the software instructions may be further configured to receive additional application data relating to one or more applications running on a device remote from the server. The software instructions may be further configured to identify an additional user interface element corresponding to the one or more applications running on the device, and modify the additional user interface element based on the updated user profile, the updated user profile being updated based on the one or more additional design patterns. The software instructions may be further configured to transmit the modified additional user interface element to the device.

In some embodiments, the software instructions may be further configured to compare the updated user profile to a second user profile, the second user profile being different from the updated user profile. The software instructions may be further configured to update the updated user profile based on comparing the updated user profile to the second user profile.

DETAILED DESCRIPTION OF SEVERAL EMBODIMENTS

Reference will now be made in detail to exemplary embodiments of the present disclosure, examples of which are illustrated in the accompanying drawings and described herein. In the drawings, like reference numerals are sometimes used to designate like structural elements. It should also be appreciated that the depictions in the figures are diagrammatic and not to scale.

The present disclosure relates generally to methods and systems for dynamically designing user interface elements that may be displayed on a user device to reflect a user's personality or other design choices automatically, without a user having to select or configure particular design choices. The personalized design elements may be part of device interface (e.g., operating system specific) or one or more applications etc. executed on the device (e.g., application specific).

A user device can be for example a smartphone, and may include a dynamic design service for communicating with an operating system or an application running on the device and causing changes to user interface elements in the display of a user interface of the user device. In some embodiments, a server in communication with the user device may include the dynamic design service, such that the dynamic design service may send requests to the user device to change user interface elements displayed by an application or the operating system. In other embodiments, the user device may include the dynamic design service, and the service may cause changes to user interface elements and user interfaces of the user device.

A user profile may be created and stored on a user device or on a server. The user profile may be updated based on design preferences detected within data, for example an image of the user's home, vehicle, or clothing, and the image may come from various sources, such as a photo or video captured by the user device or by an image sent to a server from the user device. Thus, in some embodiments, a user may be able to visualize one or more personalized interface elements on his/her device that are determined based on the user's aesthetic design choices, personality, mood or on a whim, which may be determined based on historical image data or dynamically in real-time. For example, a user may request to have one or more interface elements dynamically updated based on an automatic and in real-time interpretation of a furniture style, car style, piece of art, etc. that may be captured in an image using the device or otherwise represented in an image or other sensory input. The user profile may include design preferences, and the design preferences may be updated based upon design preferences identified in data, for example image data. The user design preferences may be determined using one or more various image analysis or machine learning techniques. In this manner, a user does not need to manually customize or alter the appearance of a user interface element of their user device because the dynamic design service, as discussed herein, may implement dynamic design changes to the user interface of the user device. Thus, the present disclosure provides technological improvements to computer techniques that may require a user to select a particular interface design etc. The technological solutions discussed herein include dynamically (and automatically) designing a user interface and user interface elements based on computer analysis of received sensory input.

Figure 1:
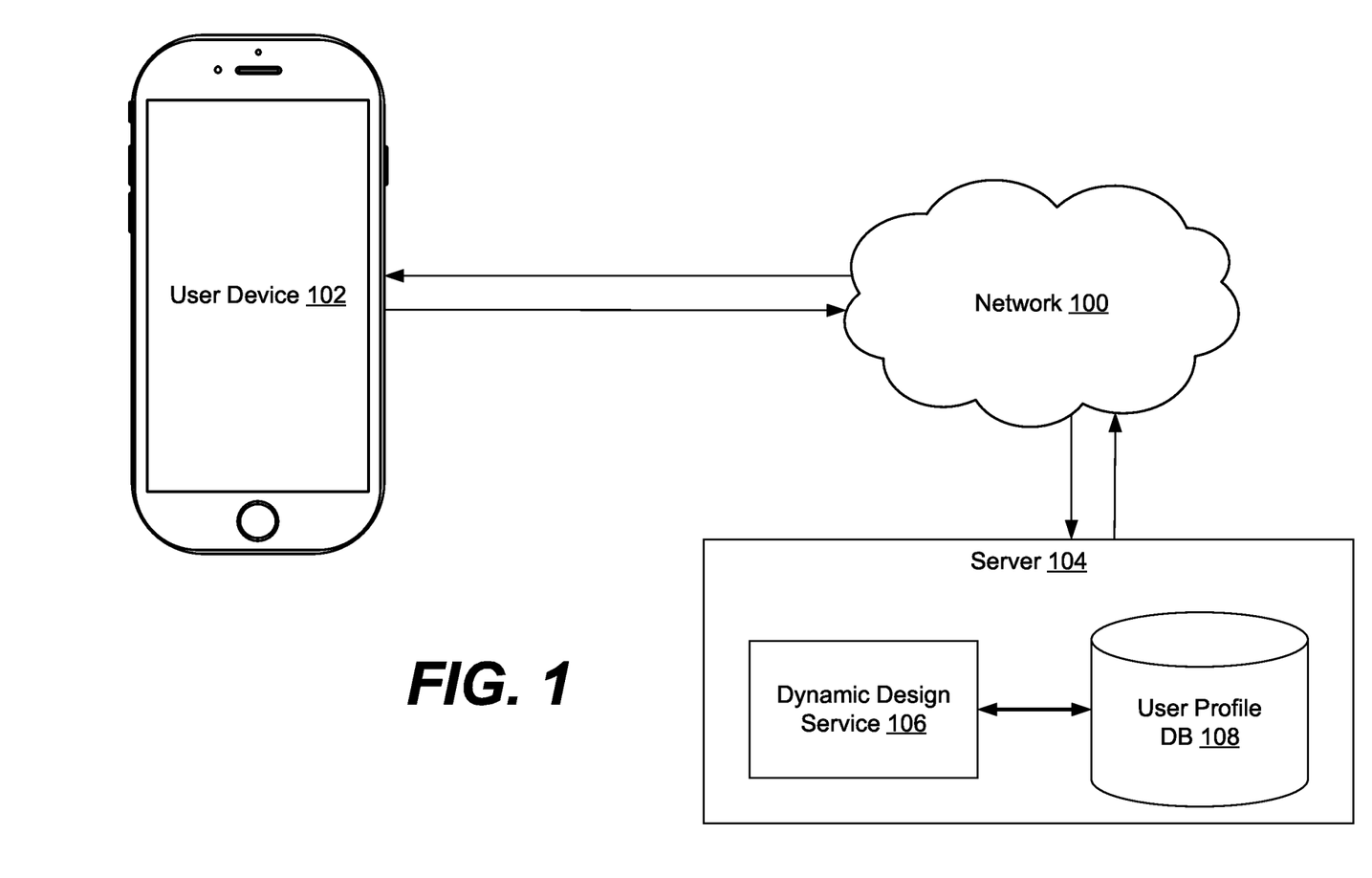
FIG. 1 shows a user device and a server device according to an embodiment of the present disclosure.

FIG. 1 shows a network for creating and managing user profiles for purposes of generating a dynamic user interface according to an embodiment of the present disclosure. The network may exist in the context of user device 102 attempting to display an application on a user interface. User device 102 may be a smartphone, tablet, laptop computer, desktop computer, or other device configured to display information on a screen. User device 102 may send user data to server device 104 by network 100, for example the Internet or another public network, private network, or combination thereof. Server device 104 may be a server configured to create a user account, where the user account is stored in memory, for example a user profile database 108. The user account may have various attributes associated with the user profile, including for example a name, an application that runs on the user device 102, and design attributes that can be modified over time based on data received from user device 102 or from other sources. Server device 104 also includes a dynamic design service 106 that contains logic for generating a dynamic user interface based on a user profile stored in user profile database 108. The dynamic design service 106 can generate dynamic user interfaces based on attributes stored in the user profile. Server device 104 is depicted as a single server, including a single dynamic design service 106 and user profile database 108 for purposes of illustration, but those of ordinary skill in the art will appreciate that server device 104 may be embodied in different forms for different implementations. For example, server device 104 may include a plurality of servers.

User device 102 may send user data to server device 104, and server device 104 may process the user data, which may be for example a request to display a web page, and/or to decide whether to process the request in a typical manner, or to process the request through dynamic design service 106. The user data may include data describing the user interface that an application or other software running on user device 102 is attempting to display. For example, the user data may indicate that the user is attempting to access an application ("app") running on user device 102, or that the user is attempting to view a website via a browser app running on user device 102.

While the network shown in FIG. 1 shows the user device 102 in communication with server device 104 through network 100, other arrangements are possible. For example, the logic for server device 104, including dynamic design service 106 and user profile database 108, can be stored on user device 102 itself, such that user device 102 does not need to access network 100 in order to obtain data regarding a user profile and/or to access dynamic design service 106. In some embodiments, user device 102 can communicate with server device 104 over a local network, such as a home network, and in other embodiments, user device 102 can communicate with server device 104 over the Internet.

The dynamic design service 106 logic may differ depending on whether the logic is located on a user device 102 or on a server device 104. For example, if the dynamic design service is located on a user device, the dynamic design service may include logic for communicating with an app, for example through an application programming interface (API), and send requests to modify user interface elements to the app. In other embodiments where the dynamic design service is located on a user device, the service may modify user interface elements based on request(s) received from a server. The dynamic design service may also be implemented to communicate with an operating system of the user device, or communicate with apps installed on the user device. In some embodiments, the dynamic design service may be implemented as part of an app that can be used to directly control the user interface of the app. In other embodiments, the dynamic design service may be implemented at the system level, such that an app installed and running on the user device can communicate with the service through, for example, system calls.

In some embodiments, user device 102 may include user data, for example transaction data, that may be used by server device 104 to update a user profile, including design preferences associated with a user profile, based on the user data received from user device 102. For example, this data may include data identifying user device 102 and/or data describing the transaction (e.g., item purchased).

Figure 2:
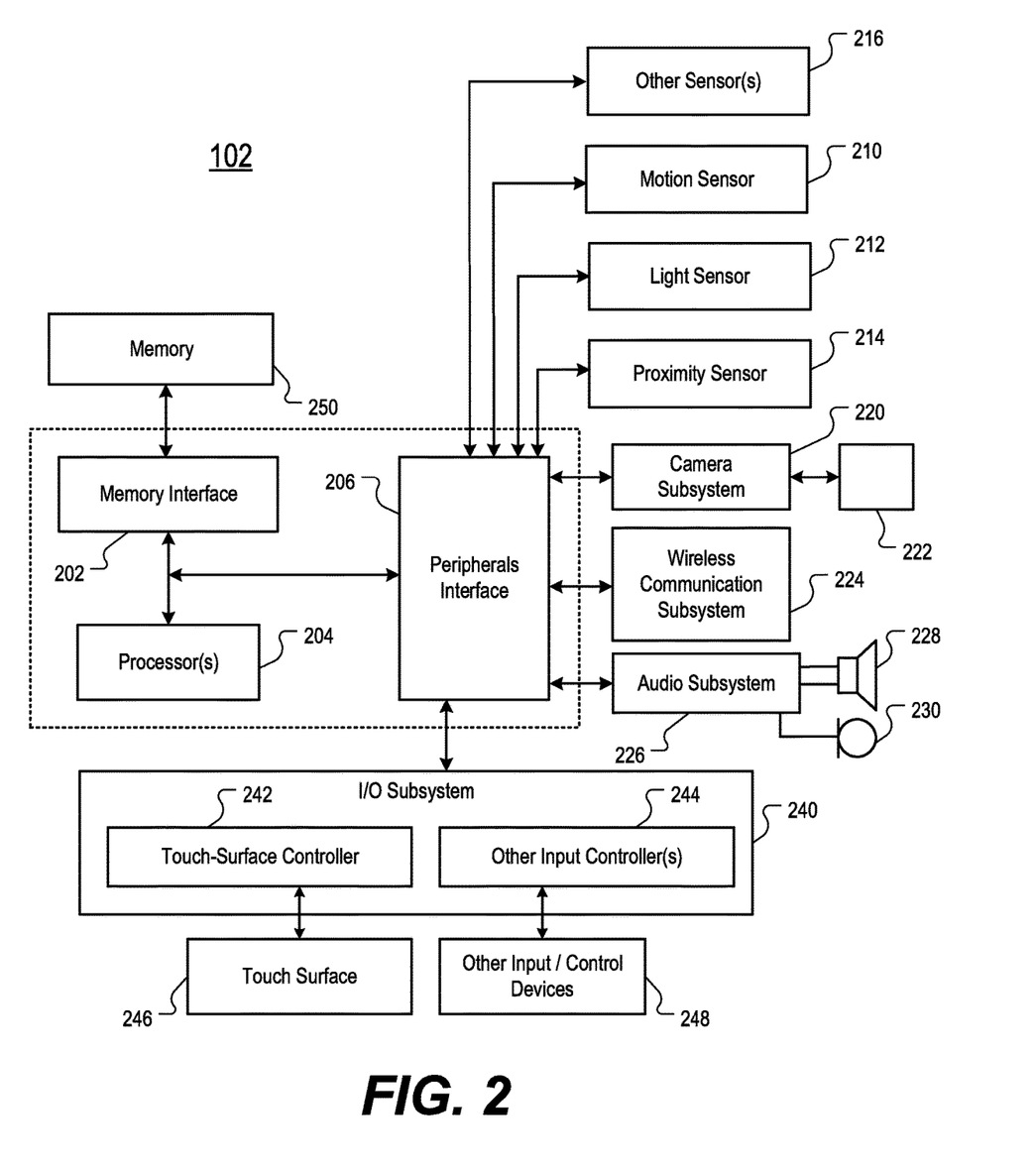
FIG. 2 shows a user device according to an embodiment of the present disclosure.

FIG. 2 shows a block diagram of an example computing device, for example a computing device configured to function as user device 102. For example, user device 102 may interact with server device 104 to gather data about a user, including a user profile and/or various attributes associated with the user profile, as described herein. The user device 102 may include a memory interface 202, one or more data processors, image processors, and/or central processing units 204 (CPU), and a peripherals interface 206. The memory interface 202, the one or more processors 204, and/or the peripherals interface 206 may be separate components or may be integrated in one or more integrated circuits. The various components in the user device 102 may be coupled by one or more communication buses or signal lines.

Sensors, devices, and subsystems may be coupled to the peripherals interface 206 to facilitate multiple functionalities. For example, a motion sensor 210, a light sensor 212, and a proximity sensor 214 may be coupled to the peripherals interface 206 to facilitate orientation, lighting, and proximity functions. Other sensors 216 may also be connected to the peripherals interface 206, such as a global navigation satellite system (GNSS) (e.g., GPS receiver), a temperature sensor, a biometric sensor, magnetometer, or other sensing device, to facilitate related functionalities.

A camera subsystem 220 and an optical sensor 222, for example a charged coupled device (CCD) or a complementary metal-oxide semiconductor (CMOS) optical sensor, may be utilized to facilitate camera functions, such as recording photographs and video clips. The camera subsystem 220 and the optical sensor 222 may be used to collect images of a user to be used during authentication of a user, e.g., by performing facial recognition analysis. The camera subsystem 220 and the optical sensor 222 may also be used to collect images of a user environment, for example the interior and/or exterior of a vehicle or a home, including objects located within such environments.

Communications may be facilitated through one or more wired and/or wireless communication subsystems 224, which can include radio frequency receivers and transmitters and/or optical receivers and transmitters. For example, the Bluetooth (e.g., Bluetooth low energy (BTLE)) and/or WiFi communications described herein may be handled by wireless communication subsystems 224. The specific design and implementation of the communication subsystems 224 may depend on the communication network(s) over which the user device 102 is intended to operate. For example, the user device 102 may include communication subsystems 224 designed to operate over a GSM network, a GPRS network, an EDGE network, a WiFi or WiMax network, and a Bluetooth network. For example, the wireless communication subsystems 224 may include hosting protocols such that the device 120 can be configured as a base station for other wireless devices and/or to provide a WiFi service.

An audio subsystem 226 may be coupled to a speaker 228 and a microphone 230 to facilitate voice-enabled functions, such as speaker recognition, voice replication, digital recording, and telephony functions. The audio subsystem 226 may be configured to facilitate processing voice commands, voiceprinting, and voice authentication, for example.

The I/O subsystem 240 may include a touch-surface controller 242 and/or other input controller(s) 244. The touch-surface controller 242 may be coupled to a touch surface 246. The touch surface 246 and touch-surface controller 242 may, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch surface 246.

The other input controller(s) 244 may be coupled to other input/control devices 248, such as one or more buttons, rocker switches, mouse wheel, infrared port, USB port, and/or a pointer device such as a stylus. The one or more buttons (not shown) may include a button for volume control of the speaker 228 and/or the microphone 230.

In some implementations, a pressing of the button for a first duration may disengage a lock of the touch surface 246; and a pressing of the button for a second duration that is longer than the first duration may turn power to the user device 102 on or off. Pressing the button for a third duration may activate a voice control, or voice command, module that enables the user to speak commands into the microphone 230 to cause the device to execute the spoken command. The user may customize a functionality of one or more of the buttons. The touch surface 246 can, for example, also be used to implement virtual or soft buttons and/or a keyboard.

In some implementations, the user device 102 may present recorded audio and/or video files, such as MP3, AAC, and MPEG files. In some implementations, the user device 102 may include the functionality of an MP3 player. The user device 102 may, therefore, include a 36-pin connector and/or 8-pin connector that is compatible with the iPod. Other input/output and control devices may also be used.

The memory interface 202 may be coupled to memory 250. The memory 250 may include high-speed random access memory and/or non-volatile memory, such as one or more magnetic disk storage devices, one or more optical storage devices, and/or flash memory (e.g., NAND, NOR). The memory 250 may store an operating system 252, such as Darwin, RTXC, LINUX, UNIX, OS X, WINDOWS, or an embedded operating system such as VxWorks. The operating system 252 may also be a mobile operating system, such as Android or iOS, when user device 102 is a mobile phone, tablet, or other device running operating system software designed for mobile applications.

The operating system 252 may include instructions for handling basic system services and for performing hardware dependent tasks. In some implementations, the operating system 252 may be a kernel (e.g., UNIX kernel). In some implementations, the operating system 252 may include instructions for performing voice authentication.

Figure 3:
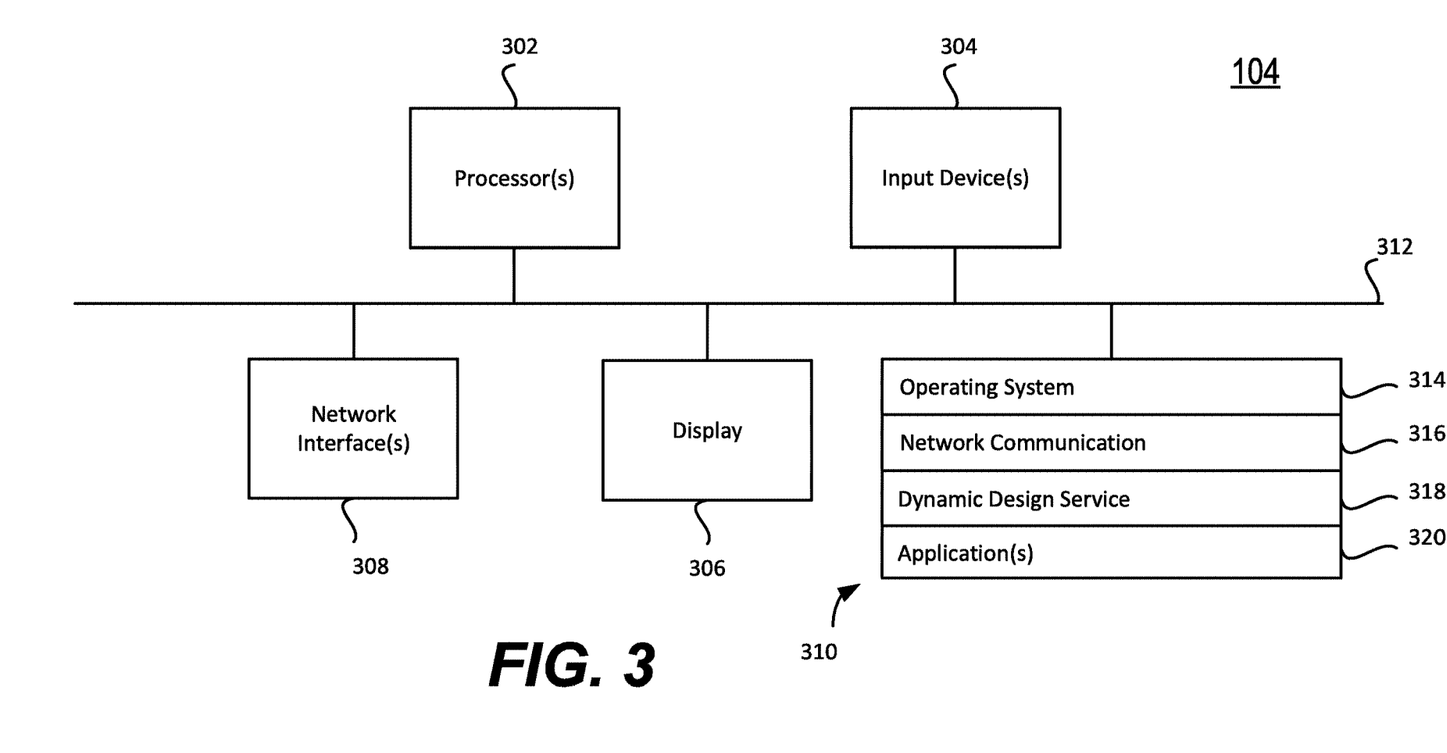
FIG. 3 shows a server device according to an embodiment of the present disclosure.

FIG. 3 is a block diagram of an example server device 104 that may implement various features and processes as described herein. The server device 104 may be implemented on any electronic device that runs software applications derived from compiled instructions, including without limitation personal computers, servers, smartphones, media players, electronic tablets, game consoles, email devices, etc. In some implementations, the server device 104 may include one or more processors 302, one or more input devices 304, one or more display devices 306, one or more network interfaces 308, and one or more computer-readable mediums 310. Each of these components may be coupled by bus 312. While server device 104 is shown as a separate device from user device 102, various elements shown in FIG. 3, for example operating system 314, network communications 316, dynamic design service 318, and application(s) 320, can all run on user device 102, including the device shown in FIG. 2.

Display device 306 may be any known display technology, including but not limited to display devices using Liquid Crystal Display (LCD) or Light Emitting Diode (LED) technology. Processor(s) 302 may use any known processor technology, including but not limited to graphics processors and multi-core processors. Input device 304 may be any known input device technology, including but not limited to a keyboard (including a virtual keyboard), mouse, track ball, and touch-sensitive pad or display. Bus 312 may be any known internal or external bus technology used for exchanging communications, for example ISA, EISA, PCI, PCI Express, NuBus, USB, Serial ATA and FireWire. Computer-readable medium 310 may be any medium that participates in providing instructions to processor(s) 302 for execution, including without limitation, non-volatile storage media, such as optical disks, magnetic disks, flash drives, etc., or volatile media, such as SDRAM and ROM.

Computer-readable medium 310 may include various instructions 314 for implementing an operating system (e.g., Mac OS, Windows, Linux). The operating system may be multi-user, multiprocessing, multitasking, multithreading, real-time, and the like. The operating system may perform basic tasks, including but not limited to recognizing input from input device 304, sending output to display device 306, keeping track of files and directories on computer-readable medium 310, controlling peripheral devices (e.g., disk drives, printers, etc.) which can be controlled directly or through an I/O controller, and managing traffic on bus 312. Network communications instructions 316 may establish and maintain network connections (e.g., software for implementing communication protocols, such as TCP/IP, HTTP, Ethernet, telephony, etc.).

Dynamic design service 318 can include instructions that evaluate user requests to display a user interface as described herein. For example, dynamic design service instructions may analyze a user request to display a user interface, access a user profile, and apply rules and/or logic that may modify a user interface to be displayed in a manner that is more preferable to a user, based at least in part on the user's profile.

Application(s) 320 may be an application that uses or implements the processes described herein and/or other processes. The processes may also be implemented in operating system 314.

The described features may be implemented in one or more computer programs that may be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program may be written in any form of programming language, for example Objective-C, Java, Swift, and C++, and it may be deployed in any form, including as a stand-alone program or as a module, component, subroutine, or other unit suitable for use in a computing environment.

Suitable processors for the execution of a program of instructions may include, by way of example, both general and special purpose microprocessors, and the sole processor or one of multiple processors or cores, of any kind of computer. Generally, a processor may receive instructions and data from a read-only memory or a random access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as a LCD (liquid crystal display) monitor, or other display devices, such as a CRT (cathode ray tube), for displaying information to the user, and a keyboard and a pointing device such as a mouse or a trackball by which the user can provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination thereof. The components of the system may be connected by any form or medium of digital data communication such as a communication network. Examples of communication networks include, e.g., a telephone network, a LAN, a WAN, and the computers and networks forming the Internet. The computer system may include clients and servers. A client and server may generally be remote from each other and may typically interact through a network. The relationship of client and server may arise by virtue of computer programs running on the respective computers and having a client-server relationship to each other.

One or more features or steps of the disclosed embodiments may be implemented using an API. An API may define one or more parameters that are passed between a calling application and other software code (e.g., an operating system, library routine, function) that provides a service, that provides data, or that performs an operation or a computation. The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API. In some implementations, an API call may report to an application the capabilities of a device running the application, such as input capability, output capability, processing capability, power capability, communications capability, etc.

Figure 4A:
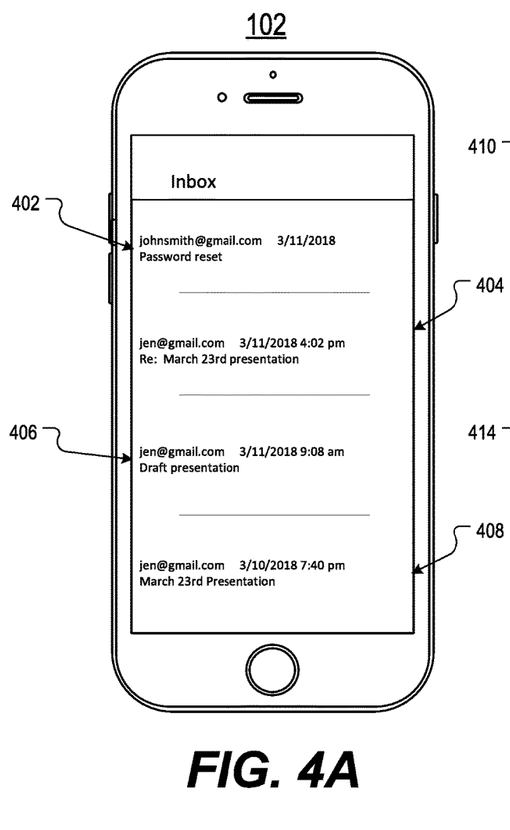
FIGS. 4A and 4B show a user device with a modified user interface according to an embodiment of the present disclosure.
Figure 4B:
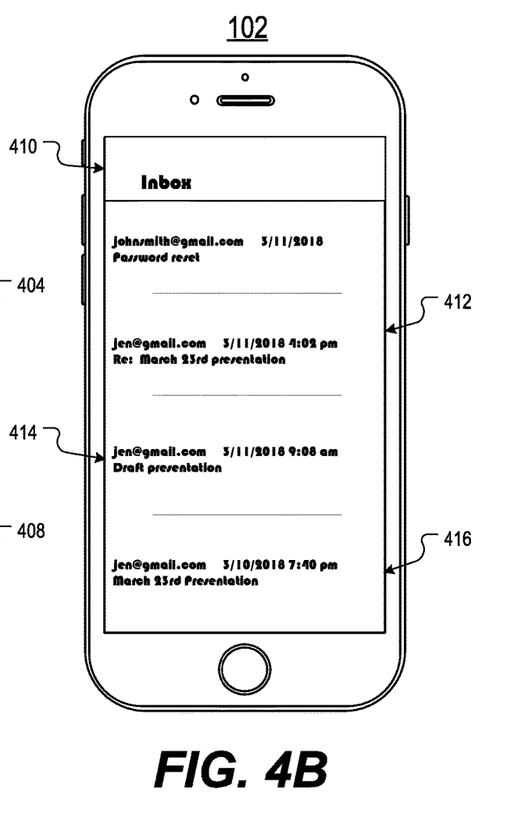

FIGS. 4A and 4B show a user device 102 and an application running on user device 102. In both figures, the running application is an e-mail application, and the user device 102 is a mobile device, such as a smartphone. In other embodiments, the application running on user device 102 could be a word processor, browser, or other application, and the user device 102 could be a tablet, laptop computer, desktop computer, or other computing device.

As shown in FIG. 4A, an e-mail application user interface is displayed on the display of user device 102. An e-mail application may allow a user to view an inbox ("Inbox") containing e-mails sent to the user of user device 102, as shown in FIG. 4A. In other embodiments, the e-mail application may present a "Sent" user interface containing e-mails that the user of user device 102 has sent to one or more intended recipients, or the e-mail application may present a "Draft" user interface containing e-mails that the user of user device 102 has begun drafting, but has not yet sent to one or more intended recipients. The Inbox, as shown in the user interface of device 102, includes four messages, message 402, message 404, message 406, and message 408. Each of message 402, message 404, message 406, and message 408 are displayed using a template that includes a particular font, font size, or font weight. Each of the messages shown are displayed using the same font, font size, and font weight, although the information specific to the e-mail may differ, including for example the date of receipt of the e-mail, the subject line of the e-mail, and the sender of the e-mail.

An embodiment of the user interface of the e-mail application is shown in FIG. 4B. FIG. 4B shows a similar e-mail application, including an Inbox and various messages (message 410, message 412, message 414, and message 416). One difference shown in FIG. 4B is the user interface of the e-mail application, including message 410, message 412, message 414, and message 416, are displayed using a different font than the font used to display Inbox and message 402, message 404, message 406, and message 408 shown in FIG. 4A.

The dynamic design service 106 of server device 104 may be configured, for example, to cause a different font to be used for the Inbox text and message 410, message 412, message 414, and message 416. The dynamic design service 106 has access to a user profile stored in user profile database 108, and analyzes the user profile to determine one or more attributes relating to the user profile. For example, the user profile may store one or more attributes relating to a design preference. In the context of FIG. 4B, the design preference may relate to a type of font, including the type of font for applications involving e-mail. The server device 104 can generate a user interface using the design preference, such as the user interface shown in FIG. 4B showing text displayed using a type of font, or alternatively can send information relating to the design preference attribute(s) back to the user device 102, which can then generate and present a user interface using the design preference, such as the user interface shown in FIG. 4B showing text displayed using a type of font.

One example of a dynamic change in a user interface element based on a user design preference is the use of a different type of font, as shown in FIGS. 4A and 4B. A person of ordinary skill in the art would appreciate that different types of dynamic changes in user interface elements are possible, including changing the font size and the font appearance (e.g., underlined, italicized, or bolded). Further, dynamic changes in user interface elements are not limited to a change relating to a font. Dynamic changes to user interface elements can for example relate to the appearance of a window itself, as shown in further detail in FIGS. 5A and 5B.

Figures 5A, 5B:
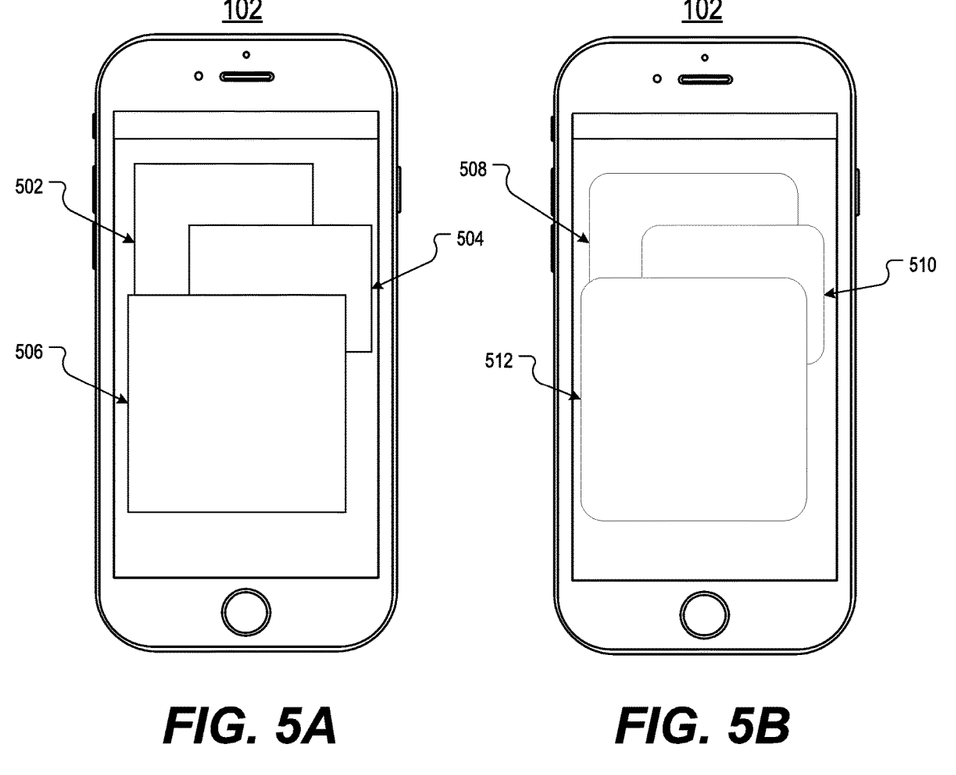
FIGS. 5A and 5B show a user device with additional modifications to its user interface according to an embodiment of the present disclosure.

FIGS. 5A and 5B show a user device 102 that has multiple windows displayed. In FIG. 5A, window 502, window 504, and window 506 are displayed on the user interface of user device 102, and in FIG. 5B, window 508, window 510, and window 512 are displayed on the user interface of user device 102. The windows displayed in both FIGS. 5A and 5B can all be related to the same application, or can relate to different applications. Some embodiments include each window relating to a separate instance of a browser running on the user device 102, for example if a user were to open new windows while using the browser. In another embodiment, each window relates to a different application, for example a browser application, an e-mail application, and a game application. These are specific examples of multiple windows running in an environment of the user device 102, and the disclosure should not be limited to any particular combination of running applications and windows. In both FIGS. 5A and 5B, the user device 102 is a mobile device, such as a smartphone. In other embodiments, the user device 102 could be a tablet, laptop computer, desktop computer, or other computing device.

As shown in FIG. 5A, a user interface is displayed on the display of user device 102, and three windows, window 502, window 504, and window 506, are displayed. Each of window 502, window 504, and window 506 are displayed using a template that specifies a particular size and shape. In certain embodiments, the user of the user device 102 can re-size any of window 502, window 504, and window 506, to have different dimensions, or may select the general area relating to window 502 or window 504 to cause the respectively selected window corresponding to the area selected to be brought to the front of the user interface. In the case of FIG. 5A, each of window 502, window 504, and window 506 contain sharp edges.

An embodiment of the user interface is shown in FIG. 5B. FIG. 5B shows a similar user interface, including multiple windows (window 508, window 510, and window 512). One difference shown in FIG. 5B is the user interface windows, including window 508, window 510, and window 512, are displayed using soft edges, rather than the sharp edge used to display window 502, window 504, and window 506 in FIG. 5A.

The dynamic design service 106 of server device 104 may be configured, for example, to change the characteristics of each of window 502, window 504, and window 506. The dynamic design service 106 has access to a user profile stored in user profile database 108, and analyzes the user profile to determine one or more attributes relating to the user profile. For example, the user profile may store one or more attributes relating to a design preference. In the context of FIG. 5B, the design preference may relate to a softening of the edges of user interface windows. The server device 104 can generate a user interface using the design preference, such as the user interface shown in FIG. 5B showing each of window 508, window 510, and window 512 having soft edges, or alternatively can send information relating to the design preference attribute(s) back to the user device 102, which can then generate and present a user interface using the design preference, such as the user interface shown in FIG. 5B each of window 508, window 510, and window 512 having soft edges.

One example of a dynamic change in a user interface element based on a user design preference is the use of a different shape for a user interface window, as shown in FIGS. 5A and 5B. A person of ordinary skill in the art would appreciate that different types of dynamic changes in user interface elements are possible, including changing the color scheme of a user interface window, or changing the shape of a user interface window in a manner different from the examples shown in FIGS. 5A and 5B. For example, the edges could be softened less than what is shown in FIG. 5B, or alternatively the edges could be softened more than what is shown in FIG. 5B.

Figure 6A:
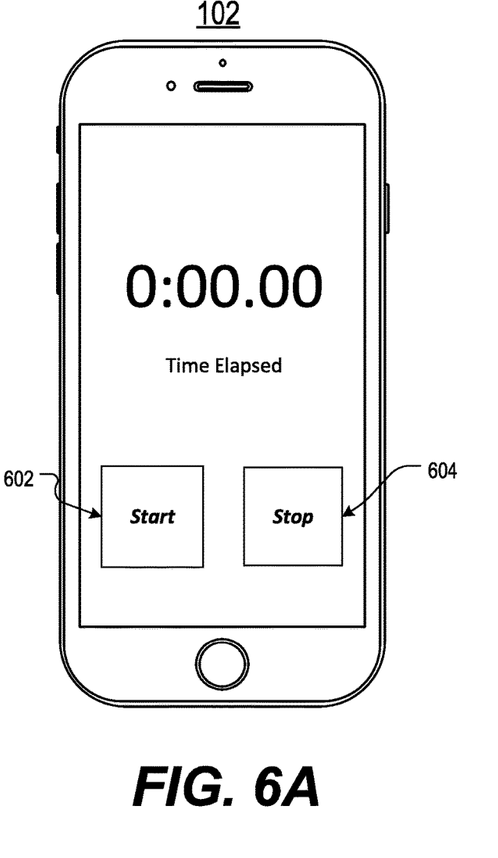
FIGS. 6A and 6B show a user device with additional modifications to its user interface according to an embodiment of the present disclosure.
Figure 6B:
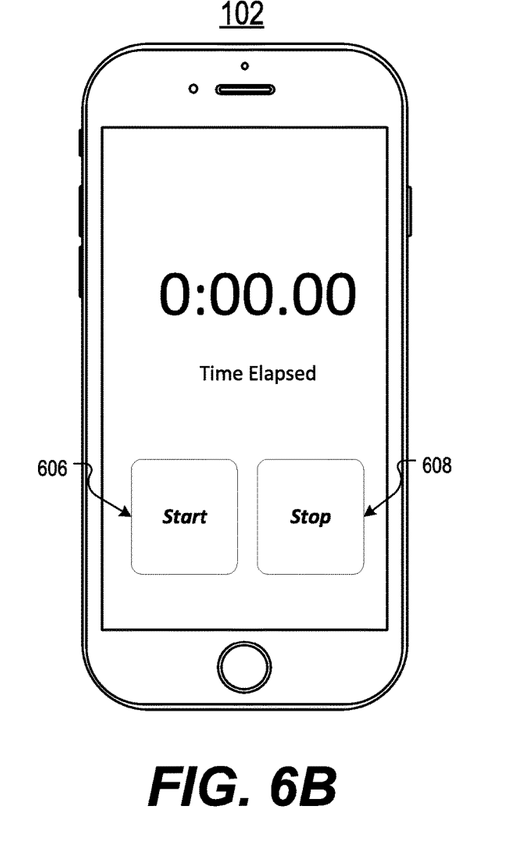

The user device 102 shown in FIG. 6A and FIG. 6B provides an additional example of dynamically designing the user interface of a screen of the user device. In FIG. 6A, a user interface is displayed, and may include an application running on the user device 102, such as a stopwatch application. The application's user interface may include a 'Start' soft button 602 and a 'Stop' soft button 604, where selecting the 'Start' button may start the stopwatch (i.e., the time elapsed may start to display seconds, minutes, and hours), and selecting the 'Stop' button may stop the stopwatch (i.e., the time elapsed may no longer increase). In the user interface shown in FIG. 6A, the Start button 602 and Stop button 604 have sharp edges. In some embodiments, the application defaults to displaying button elements with sharp edges.

FIG. 6B shows a similar user interface to that shown in FIG. 6A, except that Start button 606 and Stop button 608 may include soft, rounded edges. In some embodiments, the dynamic design service 106 may be configured to modify the user elements corresponding to the Start button 606 and Stop button 608 prior to those elements being displayed on the user interface shown in FIG. 6B.

Figure 7:
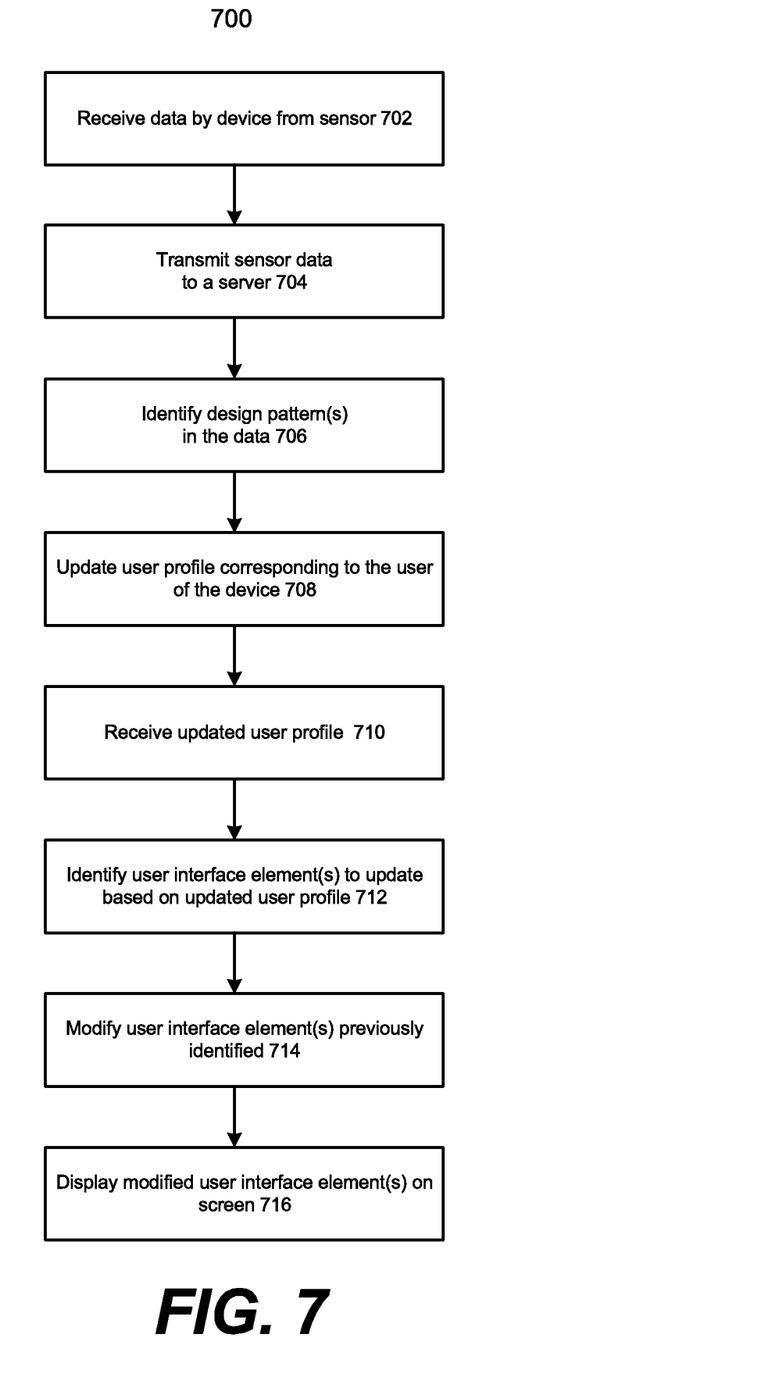
FIG. 7 shows a dynamic user interface modification process according to an embodiment of the present disclosure.

FIG. 7 shows a dynamic user interface modification process according to an embodiment of the present disclosure. User device 102 may perform certain steps of the process shown in FIG. 7, and server device 104 may perform other certain steps of the process shown in FIG. 7, for example.

At step 702, the user device 102 receives data from a sensor. The sensor could be any of the sensors disclosed in FIG. 2, including motion sensor 210, light sensor 212, proximity sensor 214, or other sensor(s) 216, that are capable of capturing information. In some embodiments, the data can be media such as a photograph or a video. The media can be obtained from a sensor and/or from camera subsystem 220 and optical sensor 222. In other embodiments, the user device 102 may receive data from another source, for example an image downloaded from the Internet, or an image sent by a contact through an e-mail or messages application. The user device 102 may receive data from other sources as well.

At step 704, a device (e.g., user device 102) transmits the sensor data to a server (e.g., server device 104). In this process, the sensor data may be sent from a user device to a server device through a network, for example the Internet, and in a manner consistent with the structure of FIG. 1. In other embodiments, this step may not be necessary, for example if the dynamic design service logic is stored on the user device 102. In such an embodiment, the user device itself contains the necessary logic to generate or analyze a user profile and dynamically update a user interface element that is displayed on the screen of the user device, and communication with a remote server is not necessary. In some embodiments, a user can select data, including images, presented to the user by a server through the Internet. The server can present images representing different style preferences to the user, and based on the user's selection of one or more images, the server can process the selected images based upon methods and processes described herein to determine one or more aspects of user profile.

At step 706, the dynamic design service 106/318 analyzes the sensor data to identify any design patterns in the data. In some embodiments, the sensor data comprises an image or images of objects found in an environment, such as a vehicle or a home. Using a home environment as an example, the sensor data (e.g., a photograph or video) may contain wall art that includes text displayed in a type of font. In some embodiments, the dynamic design service analyzes the sensor data and identifies the wall art, including the text displayed in a type of font. The dynamic design service can then use this design preference and create an association between the type of font identified from the wall art with a type of font that is used in user interfaces for a user device (e.g., user device 102). As another example, the home environment may contain furniture, where the furniture has soft, rounded edges. The dynamic design service may determine this characteristic of the furniture, and may in response change a user interface object, for example a soft button, such that the button has soft, rounded edges. In other embodiments, the dynamic design service may determine that sensor data contains wall art, and that the wall art is associated with a preference for modern art. The dynamic design service may select a font that is associated with the modern art style of the wall art. A user may have various design preferences that can be exhibited in various forms and objects, for example a car, art, clothing, furniture, or other objects. Depending on the design characteristics of such objects, the dynamic design service may identify user interface objects that can be changed to include a characteristic or design preference associated with the design characteristics of such objects.

The dynamic design service can analyze the sensor data, including the furniture, and identify that the furniture has soft, round edges. The dynamic design service can then use this design preference and create an association between the soft, round edges identified from the furniture in the sensor data with user interface elements (e.g., an application window) that can be modified to include soft, round edges, for example. Many different types of objects can be analyzed in sensor data, for example the shape or color of a vehicle, the color scheme of a room, and the shape of furniture and other objects in the sensor data. Further, sensor data can be data relating to Internet activity, for example purchased furniture, clothing, or other consumer goods. In some embodiments, the dynamic design service can analyze such sensor data (e.g., sensor data obtained from Internet activity) and identify design preferences based on that sensor data. The dynamic design service can identify relationships between objects identified in the sensor data. For example, the dynamic design service can identify a consumer item, for example a designer dress, and can identify design preferences based on other user profiles where the user associated with the user profile purchased a similar or identical designer dress.

In some embodiments, the dynamic design service 106/318 is configured to generate or analyze a user profile using artificial intelligence (AI) or machine learning (ML) technology. The sensor data may be analyzed by AI/ML, and the AI/ML may parameterize or vectorize the detected information in the sensor data, for example. The AI/ML may apply the parameterized data through a model or other programming construct, and may take output relating to parameterized data and create a user profile or user preferences that may be stored in a user profile. In some embodiments, the AI/ML logic may be part of the dynamic design service, and in other embodiments, the AI/ML logic may be its own separate, logical unit.

At step 708, the dynamic design service (e.g., dynamic design service 106) may create or update the user profile that corresponds to, or is associated with, the user of the user device (e.g., user device 102). For example, the dynamic design service can update a user profile stored in a database (e.g., user profile database 108). As other example, the dynamic design service can execute on the user device and update a user profile stored in memory local to the user device. In still other embodiments, the user profile is stored in a memory local to a server (e.g., server device 104), and the user profile stored in local memory on the server is updated by the dynamic design service. In some embodiments, the user profile is updated based on the sensor data, including the design pattern(s) identified in the sensor data.

At step 710, the server (e.g., server device 104) receives an updated user profile or user profile data indicative of one or more design preferences or design elements. In this example, the server obtains the most updated version of the user profile or profile data from a database (e.g., user profile database 108). In other embodiments, the server maintains the data that is used to update the user profile, such that the server does not need to wait to receive the updated user profile, or alternatively receive confirmation that the user profile stored in the database has been updated. In an alternative embodiment, the user device receives the updated user profile or profile data. In such an embodiment, the dynamic design service (e.g., dynamic design service 106) executes on the user device, rather than on the server device. In some embodiments, the user profile may include subprofiles, for example a work profile and a home profile. There also may be other types of subprofiles, including a weekend profile and a dynamic profile (e.g., a limited or experimental profile). For dynamic profiles, some embodiments may allow a user to experiment with different possible dynamic user interface elements by submitting image data and presenting a temporary user interface, where a user can either accept the changes displayed in the temporary user interface, or reject the changes displayed in the temporary user interface. Further, a subprofile may contain other information, including date and time related information. For example, the dynamic design service may present a different user interface on a Monday (e.g., the beginning of a work week), and a different user interface on a Friday (e.g., the end of the work week). As another example, on or near holidays, the dynamic design service may change user interface elements consistent with design preferences associated with a holiday. For example, near St. Patrick's day, the user interface may include green-colored elements.

At step 712, the server (e.g., server device 104) identifies user interface element(s) to update based on the updated user profile that was previously determined or received by the server. In some embodiments, the dynamic design service logic on server device 104 contains logic to identify user interface element(s) to modify based on the updated user profile. In other embodiments, the dynamic design service logic executes on user device 102, and contains logic for identifying user interface element(s) to modify based on the updated user profile. As an example, the dynamic design service identifies the type of font used in an e-mail application, and based on the updated user profile, the dynamic design service changes the type of font used in the e-mail application to a different font. This example is further shown for example in FIGS. 4A and 4B. A person of ordinary skill in the art would appreciate that the dynamic design service could dynamically change other user interface elements, including changing other user interface elements based on the application running on the user device.

At step 714, the identified user interface elements are modified. For example, the dynamic design service identifies the type of font used in an e-mail application, and based on the updated user profile, the dynamic design service changes the type of font used in the e-mail application to a different font. In some embodiments, the type of font may be dynamically determined, and thus may not necessarily include a change from a prior or a predetermined font. This example is further shown for example in FIGS. 4A and 4B. In other embodiments, the dynamic design interface can communicate with the application running on the user device to cause a change in the display of user interface elements. In some embodiments, for example where a user creates a new account, the dynamic design service may apply default user interface elements, and in some embodiments, the user may select a pre-defined user profile with defined design preferences. The pre-defined user profile may be used to create a dynamic user interface before the user profile is updated with data (e.g., image data) obtained from a source.

At step 716, the modified user interface elements are displayed on the screen of the user device (e.g., user device 102). The displayed modified user interface elements can be for example a change in font, as shown in FIGS. 4A and 4B, or a change in the appearance of windows corresponding to one or more applications running on the device, as shown in FIGS. 5A and 5B.

Figure 8:
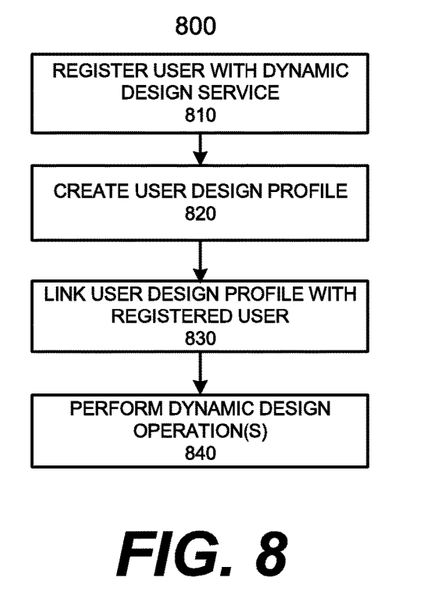
FIG. 8 shows a user registration and dynamic user interface modification process according to an embodiment of the present disclosure.

FIG. 8 shows a user registration and dynamic user interface modification process according to an embodiment of the present disclosure. User device 102 can be used to perform certain steps of the process shown, and server device 104 can be used to perform other certain steps of the process shown, for example.

At step 810, a user, through the user device, registers with the dynamic design service (e.g., dynamic design service 106). In some embodiments, the user device is in communication with a server (e.g., server device 104) and transmits user information to the server for purposes of registering the user to become eligible for the dynamic design service. In other embodiments, dynamic design service logic is installed on the user device in a manner such that registration is not required.

At step 820, a user profile is created. In some embodiments, the user profile, which is also referred to herein as a user design profile, stores various attributes relating to the design preferences of a user. For example, the attributes associated with the user profile can relate to a type of font that the user prefers, or a window shape that the user likes and prefers, or more generally to a user's style or personality or mood that may be invoked in one or more design elements and combinations of design elements. In some embodiments, the dynamic design service (e.g., dynamic design service 106) has access to the user profile, and can further modify the user profile based on additional data received from a user device (e.g., user device 102).

At step 830, the user profile (or user design profile) is linked with a registered user. In some embodiments, the registered user is the user of user device 102.

At step 840, dynamic design operations can be performed. In some embodiments, the dynamic design operations are performed in a manner consistent with the process shown in FIG. 7. In other embodiments, the dynamic design operations are performed by a dynamic design service (e.g., dynamic design service 106). As discussed above, the dynamic design service logic may be stored on a user device (e.g., user device 102), or on a server (e.g., server device 104). In the embodiment shown in FIG. 8, when a user profile has been created, the dynamic design service can modify a user interface element that is to be displayed in the user interface of a user device (e.g., user device 102).

Figure 9:
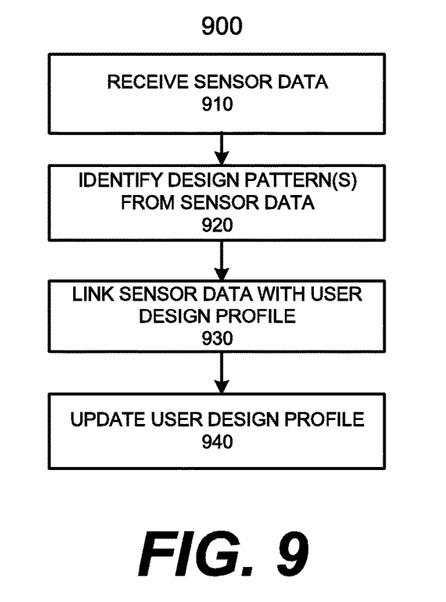
FIG. 9 shows a sensor data collection and dynamic user interface modification process according to an embodiment of the present disclosure.

FIG. 9 shows a sensor data collection and dynamic user interface modification process 900 according to an embodiment of the present disclosure. User device 102 can be used to perform certain steps of the process shown in FIG. 9, and server device 104 can be used to perform other certain steps of the process shown, for example.

At step 910, a device receives sensor data. In some embodiments, a user device (e.g., user device 102) receives the sensor data, and in other embodiments, the server (e.g., server device 104) receives the sensor data. The sensor data can include for example data relating to media, such as a photograph or video. The sensor data can be obtained from sensors and/or a camera subsystem (e.g., camera subsystem 220). In some embodiments, the sensor data is obtained from sensors that are a part of user device 102, and in other embodiments, user device 102 receives the sensor data via a transmission to user device 102. In still other embodiments, server device 104 receives the sensor data via a transmission to server device 104.

At step 920, design pattern(s) in the sensor data are identified. In some embodiments, the dynamic design service (e.g., dynamic design service 106) analyzes the sensor data to identify design pattern(s) in the sensor data. The design patterns can include for example a type of font or a shape of an object found in the sensor data, for example when the sensor data includes a photograph or video. In some embodiments, the dynamic design service is located on a user device (e.g., user device 102). In other embodiments, the dynamic design service is located on a server device (e.g., server device 104). A person of ordinary skill in the art would appreciate that the design patterns can be identified in different ways. For example, the dynamic device service could use a probability-based method for scoring one or more design patterns identified in the data and updating the user profile based on the profile data of the user profile is updated based on one or more probability deterministic scores before the processor receives the user profile, the probability deterministic scores relating to the one or more user preferences.

At step 930, the sensor data, including the design pattern(s) identified in the sensor data, is associated with a user profile (or user design profile). In some embodiments, the sensor data is obtained from a location associated with a user of a user device (e.g., user device 102), such that a relationship between the sensor data source and the user of the user device is known. In other embodiments, the dynamic design service logic executes on a server device (e.g., server device 104), and the user device (e.g., user device 102) in communication with the server device transmits the sensor data and a user device identifier to the server device. The user device identifier can for example be used to associate the design pattern(s) in the sensor data with a user profile. In other embodiments, if no user profile is found that is associated with a user of the user device, then dynamic design service logic requests creation of a new user profile (or new user design profile) that can be used to store attributes relating to the design pattern(s) found in the sensor data.

At step 940, a user profile (or user design profile) is updated. In some embodiments, the user profile is updated based on the identified design pattern(s) found in the sensor data. In other embodiments, once the user profile is updated, the dynamic design service (e.g., dynamic design service 106) performs logic for dynamically changing a user interface element for an application running on a user device (e.g., user device 102) based on the updated user profile.

While various embodiments have been described above, it should be understood that they have been presented by way of example and not limitation. Various changes in form and detail can be made therein without departing from the spirit and scope. For example, other steps may be provided or steps may be eliminated from the described flows, and other components may be added to or removed from the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

What is claimed is:

1. A device configured to dynamically display user interface elements on the device, the device comprising:
    a processor;
    a display in communication with the processor;
    a wireless transceiver in communication with the processor; and
    a non-transitory memory storing instructions that, when executed by the processor, cause the processor to perform processing comprising:
        receive sensor data relating to one or more inanimate physical objects, the sensor data generated by a sensor, the sensor data comprising image data of one or more images including the one or more physical objects;
        transmit, by the wireless transceiver, the sensor data to a server;
        identify a first shape in the one or more physical objects that is captured in the sensor data;
        receive, by the processor, design preference data describing one or more user design preferences determined by the server using a machine learning technique, based on the one or more physical objects included in the sensor data, wherein the design preference data indicates a design preference of the user for the first shape;
        identify one or more user interface windows corresponding to an application running on the device, wherein each of the one or more user interface windows has a border that has a second shape and wherein the second shape is different from the first shape;
        modify, based on the design preference data, the second shape of each of the one or more user interface windows to include the first shape identified in the one or more physical objects.

2. The device of claim 1, wherein the processing further comprises:
    receive additional design preference data relating to one or more inanimate second physical objects, the additional design preference data being received from a second sensor remote from the device;
    transmit the additional design preference data to the server; and
    receive additional design preference data relating to an additional design preference of the user.

3. The device of claim 1, wherein the processor receives the design preference data relating to one or more physical objects from the sensor.

4. The device of claim 1, wherein the first shape consists of rounded edges.

5. The device of claim 1, wherein the first shape consists of sharp edges.

6. The device of claim 1, wherein the sensor is remote from the device.

7. A method for dynamically changing one or more user interface elements on a device comprising:
    receiving, by a processor of the device, user data relating to one or more inanimate physical objects, the user data generated by a sensor, the user data comprising one or more images;
    transmitting, by a wireless transceiver of the device, the user data to a server;
    receiving, by the processor, design preference data in response to transmitting the user data to the server, the design preference data based on a first shape identified from the one or more physical objects, the one or more physical objects identifiable in the one or more images, the design preference data identified by the server using a machine learning technique, wherein the design preference data indicates a design preference of a user for the first shape;
    identifying, by the processor, the one or more user interface elements corresponding to an application running on the device, wherein the one or more user interface elements comprise one or more user interface windows, wherein each of the one or more user interface windows comprises a border having a second shape different from the first shape;
    modifying, by the processor, the second shape of each of the one or more user interface windows to include the first shape identified in the one or more physical objects based on the design preference data; and
    displaying the one or more modified user interface windows on a display of the device,
    wherein the displayed one or more modified user interface windows relate to the application running on the device.

8. The method of claim 7, further comprising:
receiving, by a server, the user data;
analyzing, by the server, the user data to identify the one or more inanimate physical objects;
identifying, by the server, the design preference data based on the one or more inanimate physical objects; and
updating, by the server, a user profile based on the design preference data.

9. The method of claim 7, further comprising:
receiving, by the processor, additional user data relating to one or more additional inanimate physical objects, the additional data being received from a second sensor, the additional user data comprising one or more additional images, the additional images being different from the one or more images, and the one or more additional physical objects being different from the one or more inanimate physical objects;
identifying additional design preference data from the additional user data, the additional design preference data being based on the one or more additional inanimate physical objects; and
updating a user profile based on the additional design preference data.

10. The method of claim 7, wherein the one or more user interface elements each further comprise a font, and wherein modifying the one or more user interface elements further comprises changing the font to a different font type based on the design preference data.

11. The method of claim 10, wherein the one or more inanimate physical objects further comprises a poster, and wherein the different font type is based on content of the poster.

12. The method of claim 7, wherein the sensor is in the device, and wherein the sensor further comprises a camera.

13. The method of claim 7, wherein the first shape consists of rounded edges.

14. The method of claim 7, wherein the first shape consists of sharp edges.

15. A system for providing dynamic design of user interface elements comprising:
a server comprising a non-transitory memory, the memory storing software instructions; and
one or more processors configured to execute the software instructions to:
receive user data relating to one or more inanimate physical objects, the user data comprising one or more images comprising the one or more physical objects, the one or more physical objects embodying one or more design patterns;
analyze the user data to identify the one or more physical objects;
identify, using a machine learning technique, a design patterns based on the one or more physical objects, the one or more physical objects having a first shape, wherein the design pattern indicates a user preference for the first shape;
create a user profile, the user profile corresponding to a user;
update the user profile, the updated user profile based on the design patterns identified based on the one or more physical objects;
receive application data relating to one or more applications running on a device remote from the server;
identify a user interface element corresponding to the one or more applications running on the device, the user interface element comprising a user interface window, wherein the user interface element comprises a border having a second shape different from the first shape;
change the border of the user interface window to the first shape based on the design patterns from the updated user profile; and
transmit the modified user interface window to the device,
wherein the modified user interface window is displayed on a screen of the device, the device running the one or more applications when the modified user interface window is displayed.

16. The system of claim 15, the software instructions further configured to:
receive additional data relating to one or more additional inanimate physical objects, the additional data comprising an additional design pattern based on the one or more additional inanimate physical objects, the additional design patterns being different from the design pattern;
identify the additional design patterns based on the one or more additional inanimate physical objects; and
update the user profile based on the additional design patterns.

17. The system of claim 16, wherein the user interface element further comprises a font, and wherein the software instructions for modifying the user interface element are further configured to change the font to a different font based on the updated user profile.

18. The system of claim 16, the software instructions further configured to:
receive additional application data relating to one or more applications running on a device;
identify an additional user interface element corresponding to the one or more applications running on the device;
modify the additional user interface element based on the updated user profile, the updated user profile updated based on the additional design pattern; and
transmit the modified additional user interface element to the device.

19. The system of claim 18, the software instructions further configured to:
compare the updated user profile to a second user profile, the second user profile being different from the updated user profile; and
updating the updated user profile based on comparing the updated user profile to the second user profile.

20. The system of claim 15, wherein the first shape consists of rounded edges.

* * * * *